United States Patent [19]

Hamilton

[11] Patent Number: 4,593,733

[45] Date of Patent: Jun. 10, 1986

[54] TREE FELLING HEAD HAVING A RIM DRIVEN ROTARY CUTTER

[75] Inventor: Douglas D. Hamilton, Montreal, Canada

[73] Assignee: Logging Development Corporation, Montreal, Canada

[21] Appl. No.: 605,219

[22] Filed: Apr. 30, 1984

[51] Int. Cl.[4] ............................ A01G 23/08; B27B 5/14
[52] U.S. Cl. ..................................... 144/34 R; 30/389; 83/469; 83/839; 144/336; 144/241
[58] Field of Search ................ 30/389; 83/469, 591, 83/592, 594, 839, 840; 144/3 D, 34 R, 336, 218, 241

[56] References Cited

U.S. PATENT DOCUMENTS

| | | |
|---|---|---|
| 460,679 | 11/1891 | Hammond . |
| 1,179,910 | 4/1916 | Greenfield . |
| 1,388,186 | 8/1921 | McCormick ................ 30/389 |
| 1,642,668 | 8/1927 | Brey . |
| 2,341,035 | 8/1942 | Grzelak . |
| 2,462,314 | 2/1949 | Fuqua . |
| 2,490,255 | 12/1949 | Chase . |
| 2,599,495 | 6/1952 | Smith . |
| 2,601,366 | 6/1952 | Chapman . |
| 2,701,590 | 2/1955 | Barker . |
| 2,804,105 | 8/1957 | Stone . |
| 2,972,363 | 2/1961 | Santilli . |
| 3,122,184 | 5/1961 | Larson . |
| 3,135,304 | 6/1964 | Breer et al. . |
| 3,808,685 | 5/1974 | Santilli . |
| 3,902,538 | 9/1975 | Muirhead .............. 144/34 R |
| 3,930,310 | 1/1976 | Santilli ................. 30/389 |
| 4,472,880 | 9/1984 | Johansson . |

FOREIGN PATENT DOCUMENTS

| | | |
|---|---|---|
| 440992 | 4/1927 | Canada . |
| 898661 | 4/1972 | Canada . |
| 964559 | 3/1975 | Canada . |
| 983825 | 2/1976 | Canada . |
| 994647 | 8/1976 | Canada . |
| 1022437 | 12/1977 | Canada . |
| 1029283 | 4/1978 | Canada . |
| 1059408 | 7/1979 | Canada . |
| 1063488 | 10/1979 | Canada . |
| 1140029 | 1/1983 | Canada . |
| 25296 | 5/1959 | German Democratic Rep. ... 30/389 |
| 1032816 | 6/1966 | United Kingdom . |

OTHER PUBLICATIONS

"Rotosaw—A Unique Circular Saw Design that Eliminates Butt Damage and Shatter," Risely Equipment Ltd.

Primary Examiner—W. D. Bray
Attorney, Agent, or Firm—Stanley E. Johnson

[57] ABSTRACT

A tree felling head which includes a frame having a grapple mounted thereon with a grapple jaw which may be selectively opened and closed to respectively receive and grasp a standing tree and power means to selectively open and close the grapple; and a severing device mounted on said frame below said grapple for severing a standing tree. The severing device is a rim driven planar circular saw mounted around a peripheral portion thereof on an arm pivotally attached to the frame for movement in a plane transverse to the length of the standing tree, and included is a second power means for effecting rotation of said severing device.

18 Claims, 10 Drawing Figures

TREE FELLING HEAD HAVING A RIM DRIVEN ROTARY CUTTER

FIELD OF THE INVENTION

This invention relates to an apparatus for cross-cutting trees and more particularly to an improved felling head for felling trees.

BACKGROUND OF INVENTION

The valuable part of a tree is the butt area where the felling cut is made and there has been increasing concern over the damage being done to this area by severing devices now in use, particularly shears. To overcome this, numerous proposals have been made adapting chain saws to felling heads in place of the shear blades and a large number of the same are in operation. The main drawback, however, of chain saws is their fragility.

Numerous proposals have also been made adapting circular saw blades and cutting disks for cutting trees and severing standing trees. In the majority of the known devices, the circular saw blade is mounted on a central axle and, in some cases, are rotated at high speeds, i.e. rim speeds in the range of 10,000 to 20,000 f.p.m. Some feel these speeds are necessary to give a high quality cut and perhaps more importantly to build up a reservoir of energy which can be applied to produce a rapid cut. Varying degrees of success have been achieved by the devices now known.

One problem with the majority of the known circular saw devices is that they are bulky. One reason for this is that the rotary cutter running on a central axis must have a diameter at least twice that of the tree to be cut plus space required for the hub and axle. It has been found that a minimum size for the saw is about 2½ times the diameter of the largest tree to be cut. This ratio also holds true for two cutters abreast when each cuts half of the tree.

Another reason contributing to the bulkiness of circular saws is that, in many cases, they require protection particularly where slim disks are used to minimize the kerf loss. Also, in many instances, the saw blade is retractably mounted in a housing which increases the bulk of the device and requires additional apparatus to effect a reciprocating stroke at least equivalent to the largest diameter of tree to be cut.

Some disks are not protected as they do not retract and while they are less bulky they must be heavy enough to withstand impact loads imposed thereon in addition to those produced by cutting. Also, they run at high rim speeds and thus store a great deal of energy. This permits a very fast cut but the energy release can also produce damaging and dangerous stresses in the disk and its teeth when the disk engages the tree to be cut or, even more seriously, engages stones or bed-rock.

One known device (see Canadian Pat. No. 1,140,029 issued Jan. 25, 1983 to A. Larose) employs two saws in stacked relation to each other with enough space between the saws to support and drive them with a chipping element being disposed between the blades to clear the kerf. The saw is driven at a high speed and not protected and therefore subject to damage. Such arrangement, however, is somewhat more compact in diameter than other known devices because the saws are supported and driven by means between the saw blades thus leaving the upper and lower faces clear, resulting in that the saw diameter need only be somewhat larger than the largest tree to be cut. The penalty in this solution is in the width of the kerf which must be large enough to permit passage of the two saws and the supporting and driving mechanism between them. The kerf is so wide that the wood loss to sawdust is roughly the same as that damaged by shears. This wood can not be used for pulp as it is sheared wood and left behind in the forest. This solution, by some, is felt to be a retrogressive step in the art.

In summary, the known devices for cross-cutting trees, particularly the felling cut, are fragile in relation to the environment where they must work, some of them being dangerously so because of their fly-wheel characteristics. Most of them are excessively bulky, and the centrally driven double saw blade that is not, produces an unacceptable kerf loss.

SUMMARY OF INVENTION

The general purpose of the present invention is to provide a tree felling head having a circular cross-cutting saw and which overcomes the disadvantages of presently known devices. This is accomplished by utilizing a cutting disk, i.e. a circular saw blade, supported and driven at or near the other rim. The arrangement is compact as the saw disk (or blade) need only be slightly larger than the largest tree to be cut. The single blade is almost fully supported by the rim thereof and the cutting forces act directly along the rim. It can therefore be thin enough to produce small kerf widths similar to those of conventional chain saws and at the same time be sturdy enough to support cut trees.

The disk-saw can be operated over a wide range of speeds through the choice of a suitable bearing and drive arrangement. In the present proposal the preferred embodiment is a low speed arrangement which avoids the damage and danger potential of high speed disks. The required power is applied through a high-torque, low speed motor of sufficient power to effect the severing and to overcome, in most cases, pinching forces exerted by leaning trees.

Teeth are bolted to the disk thus permitting a wide variety of tooth patterns for different conditions and easy replacement of damaged or dull teeth.

The feed speed is controllable for best application of the cutting power and controlling the quality of the cut.

The pinion may be cut back at the root of the teeth to provide some self-cleaning.

Air also can be used in two ways with the present apparatus. It can be jetted onto the driving and bearing surfaces to keep them clean and it can be introduced into the bearing cavity where, in conjunction with self-lubricating bearing material, will permit much higher rotational speeds if desired.

BRIEF DESCRIPTION OF DRAWINGS

The invention is illustrated by way of example with reference to the accompanying drawings wherein.

DESCRIPTION OF PREFERRED EMBODIMENT

Figure 1:
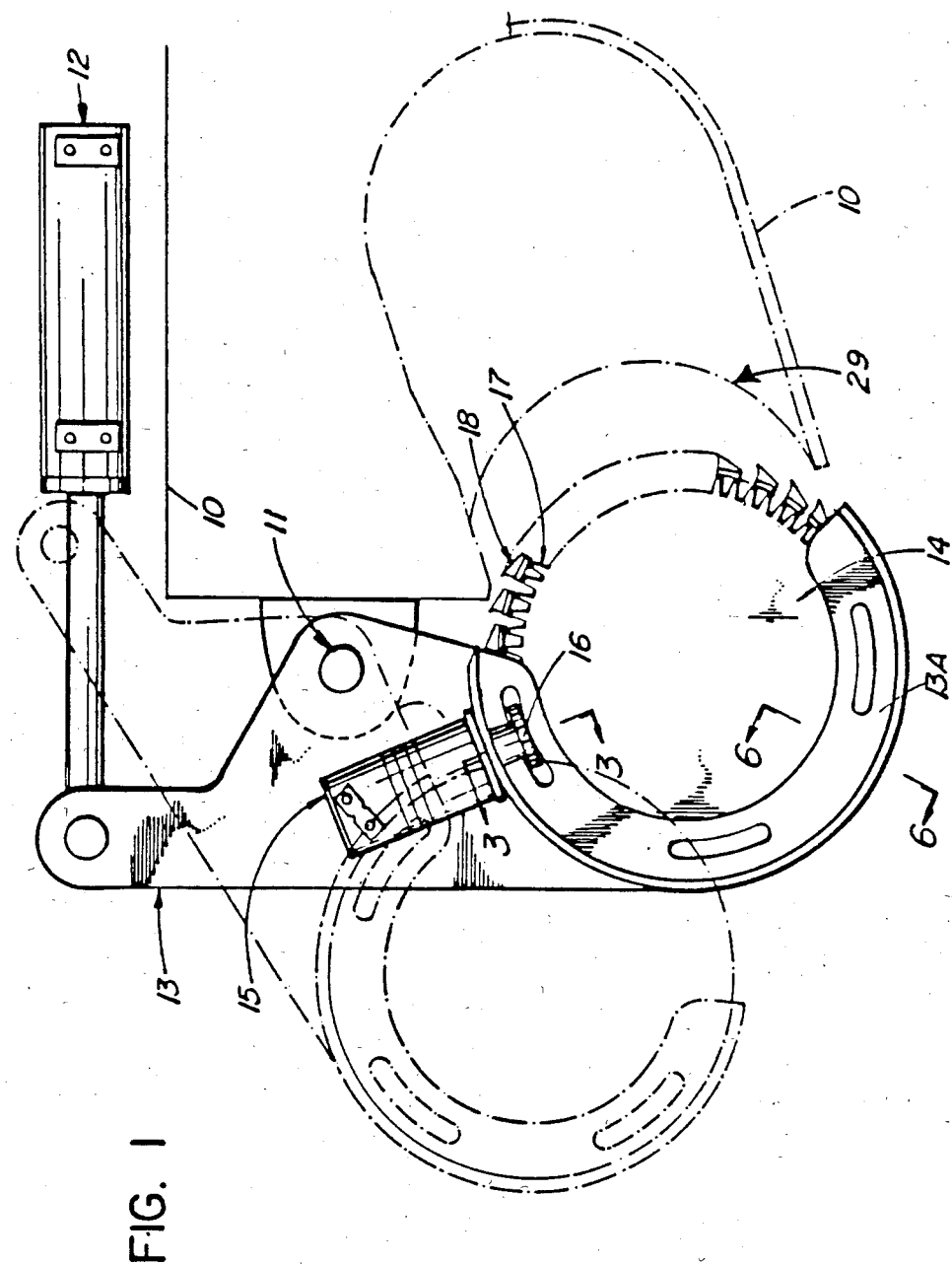
FIG. 1 is a plan view of the severing device shown attached to the base of a felling head illustrated in part by broken line.

Referring to FIG. 1, there is illustrated, partly in broken line, the outline of the base portion 10 of a felling head having a rim drive severing device mounted thereon and provided in accordance with the present invention. The base portion of the felling head is of the type disclosed in Canadian Pat. No. 1,103,130 issued June 16, 1981 to my company, Logging Development Corporation, or Canadian Pat. No. 1,065,742 issued Nov. 6, 1979. The felling head includes grapple arms 10A and 10B at least one of which is pivotally mounted and together provide a grapple jaw for grasping a standing tree. The grapple is mounted on a frame and the severing device is mounted on such frame below the grapple. The grapple arms are moved by a means designated 10C. It will, however, be obvious to anyone skilled in the art that the principles disclosed herein can be applied to any felling head and to other cross-cutting devices as well as those employed for cross-cutting on tree processors.

The severing device has a frame 13 (also referred to as an arm) pivotally attached to the base of the felling head by a pin 11 and is controllably moved by a hydraulic cylinder unit 12 connected thereto. A rotary cutting device 14 (i.e. a circular disk) is mounted on the outer end of frame 13 (in a manner to be described hereinafter) and is driven by a motor 15 through pinion gear 16 which mates with gear teeth 17 adjacent the outer periphery of the rotary disk 14. Cutting teeth 18 (or abrading elements) are mounted (preferably detachably) on the outer end of gear teeth 17. The rotary cutter 14 is supported adjacent the outer periphery thereof by suitable bearings in a part circular portion 13A on the outer end of arm 13. The part circular portion 13A is U-shaped in cross-section providing a curved channel that receives a portion of the saw disk around a portion of the periphery of the cutting disk. Actuation of the cylinder 12 pivots the arm 13 about the pin 11 and moves the rotary cutter 14 toward and away from a sharp edged arcuate anvil 29 on the frame of the felling head. A tree to be severed is placed between the rotary cutter and the arcuate anvil 29 and the arm is controllably moved at an appropriate speed toward the anvil so as to cut the tree.

Figure 2:
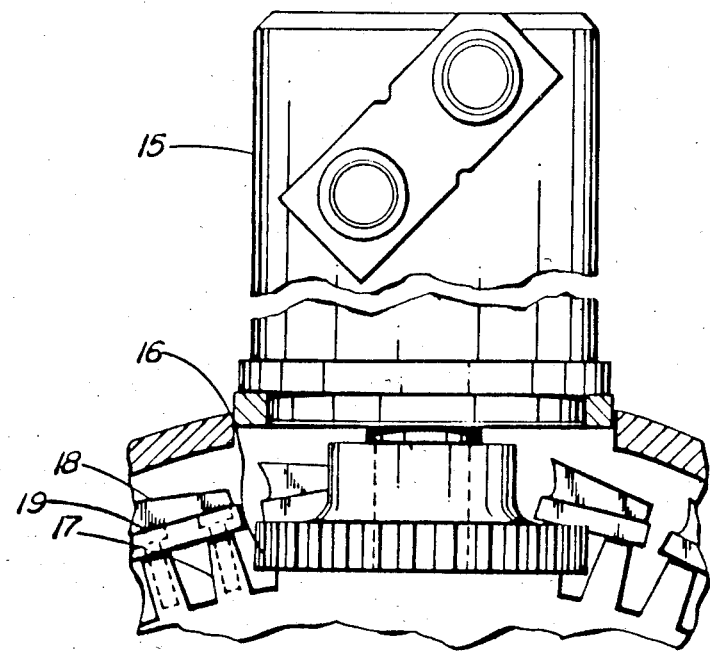
FIG. 2 is a partial, enlarged, detailed plan view of the disk-saw showing the drive arrangement and the replaceable teeth.

FIG. 2 illustrates in greater detail the drive motor 15 and gear or pinion 16 driven thereby, meshing with gear teeth 17 on the rotary cutter. The cutting or abrading elements 18 are shown detachably attached to the tips of the two adjacent gear teeth 17 by threaded studs 19. The gear teeth 17 are preferably of the Face gear type and the pinion 16 is preferably a Spur gear suitably proportioned to mesh with the Face gear teeth.

Figure 3:
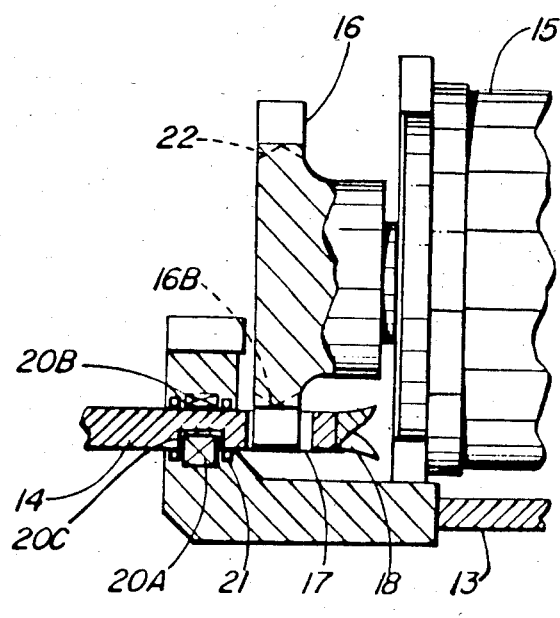
FIG. 3 is a sectional view of the disk-saw taken essentially along line 3—3 of FIG. 1 showing the drive and bearing arrangements and the pinion self-cleaning modifications.

FIG. 3 is a sectional view at the point of gear contact illustrating bearing support elements 20A and 20B for supporting and guiding the rotary cutter and sealing elements 21 located on opposite sides of each of the bearing to retain lubricant and exclude contamination. The bearing 20B on the upper surface of the circular cutter 14 engages the flat side face of the cutter and it will be noted on the lower surface of the bearing 20A projects into a groove 20C in the lower side face of the cutter. The bearings 20A and 20B are mounted in the curved channel of the arm portion 13A which is U-shaped in cross-section and extends essentially along the full length of the part circular housing. The bearings are curved so as to be part circular with a radius of curvature about the center point of the circular cutting disk. Also in this embodiment, it will be noted gear teeth of pinion gear 16 are cut back as indicated at 16B, the purpose of which is to have a self-cleaning effect as the pinion gears mesh with the gear teeth 17.

Figure 4:
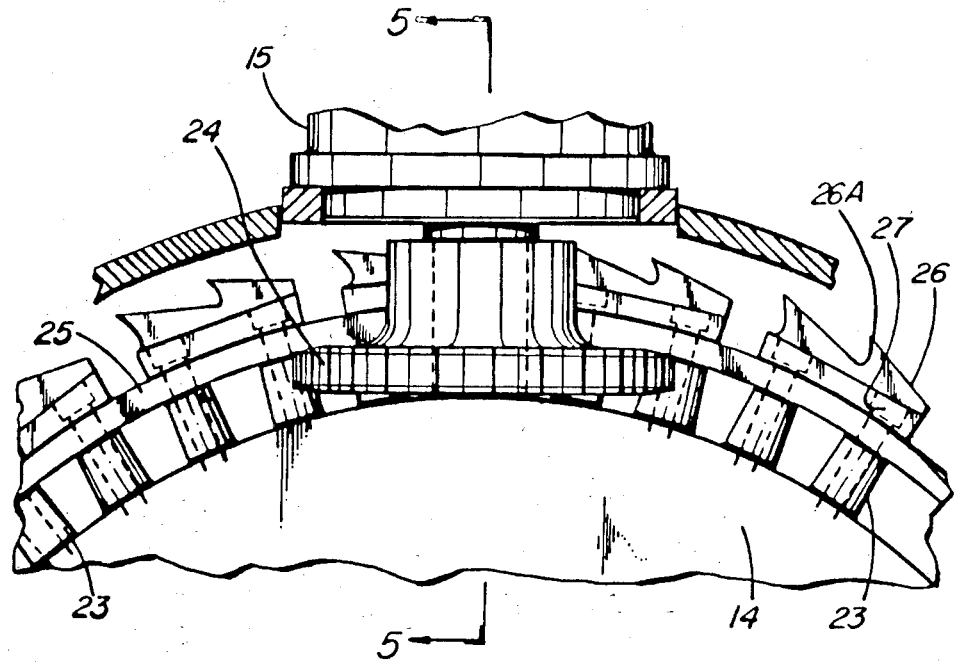
FIG. 4 is a plan view similar to FIG. 2 but illustrating an alternative drive arrangement employing some chain drive technology.
Figure 5:
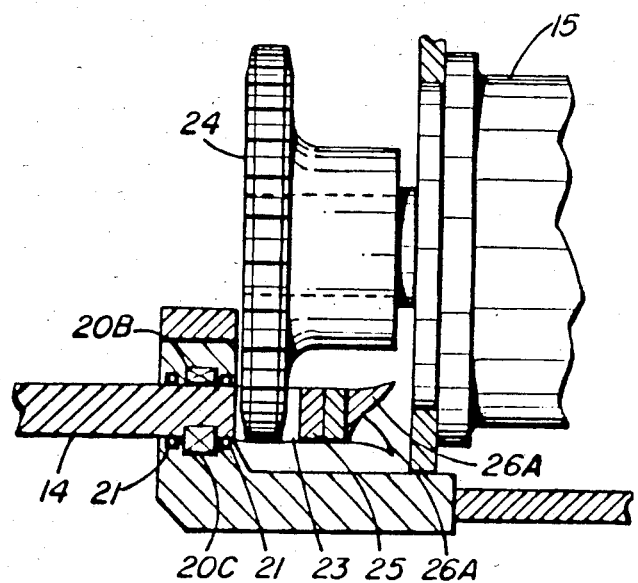
FIG. 5 is a sectional view of the bearing and drive taken along line 5—5 of FIG. 4.

In FIGS. 4 and 5 there is illustrated an optional drive arrangement wherein roller assemblies 23 replace the Face gear teeth 17 and sprocket 24 with special gear teeth replaces the Spur gear 16. The rollers 23 are retained in position by a retaining ring 25 held in place by cutting elements 26 attached to the circular disk 14 by cap screw elements 27. It will be noted the cutting elements 26 illustrated are different from the cutting elements 18 in that two cutting projections 26A are provided rather than a single cutting element shown in FIG. 1. In most instances, the two adjacent cutting teeth 26A would be offset in opposite directions relative to the plane of the disk, and offset sufficiently to provide a kerf wider than the thickness of the disk as is normal with any cutting blade.

FIG. 5 is a sectional view taken along line 5—5 of FIG. 4 illustrating the point of contact of the drive from which it can be seen the cutting projections 26A of the teeth are offset and positioned around the outer periphery of the ring 25 which retains rollers 23 on projections or on studs secured to the disk 14.

Figure 6:
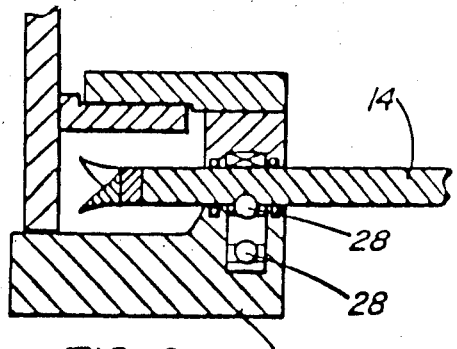
FIG. 6 is a sectional view of the bearing and drive showing a ball bearing alternative to the metal bearings of FIG. 3 and FIG. 5.

FIG. 6 is a cross-sectional view taken essentially along line A—A of FIG. 1, but illustrating a modified bearing arrangement to support the rotary disk 14. In FIG. 6 there is illustrated a circulating ball bearing assembly 28 which will permit much higher rotational speeds of the cutter 14 than possible with metal bearings designated 20A and 20B in FIGS. 3 and 5. While the circulating ball bearing assembly 28 is illustrated only on a lower surface, it could optionally be used on the upper surface or both.

Figure 7:
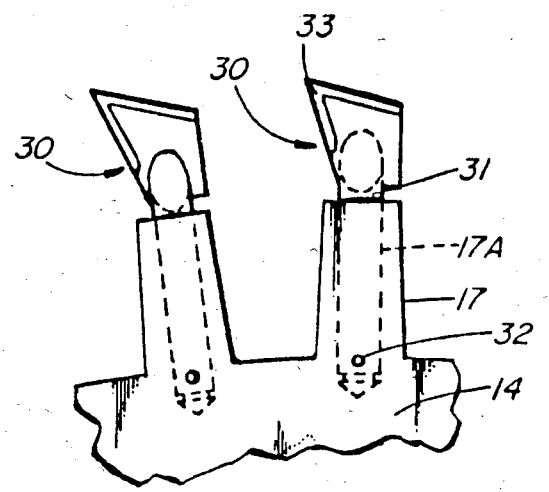
FIG. 7 is a partial plan view of a modified gear tooth and cutting tooth arrangement.
Figure 8:
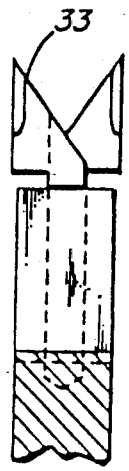
FIG. 8 is a right hand elevational view of FIG. 7.
Figure 9:
FIG. 9 is a view similar to FIG. 8 but with the cutting tooth rotated to a different position and FIG. 10 is a diagrammatic side elevational view of a tree felling head.
Figure 10:
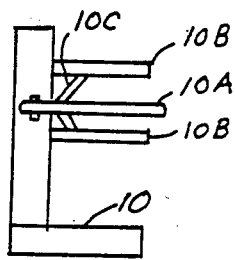

In the rotary cutter illustrated in the foregoing embodiments, the cutting teeth are secured to two adjacent gear teeth on the outer periphery of the disk which mesh with the pinion gear. Referring to FIGS. 7 to 9 inclusive, there is illustrated a single cutting tooth 30 mounted individually on each of the gear teeth 17 on the cutting member 14. The cutting tooth member 30 consists of a stem 31 projecting into a hole or recess 17A in gear tooth 17 and retained in position by a pin 32. On the outer end of stem 31 is a member 33 appropriately shaped with cutting edges for cutting wood. The shaft 31 is preferably circular, fitting into a cylindrical hole 17A in the tooth 17 and the material and/or size of pin 32 is appropriately chosen so as to be a shear pin in the event cutting member 33 encounters unusual or impact forces during cutting, for example, striking a stone rather than cutting through wood. The cutting part 33 of members 30 are oppositely directed on adjacent gear teeth on the ring cutting member so as to cut a kerf of sufficient width to clear the circular plate 14. FIG. 8 illustrates one tooth facing in one direction and in dotted line the next adjacent tooth is illustrated facing the opposite direction.

In this embodiment, as illustrated in FIG. 9, the cutting portion 33 may be positioned differently so as to provide the appropriate cutting action dictated by the requirements at the time. In order to do this in place of shear pin 32, a set screw or set screws may be utilized to retain the shaft 31 at an appropriate position. It will, of course, be understood the stem may be pre-drilled for the appropriate angle required or pre-drilled at different positions permitting setting the teeth at different predetermined angles.

I claim:

1. A felling head comprising in combination:
   (a) a frame having a grapple mounted thereon and comprising a pair of jaw members, at least one of which is pivotally mounted on the frame for movement toward and away from the other and together providing a grapple jaw which may be selectively opened and closed to respectively receive and grasp a standing tree, power means connected to said movable grapple jaw members selectively to open and close said grapple; and
   (b) a severing device mounted on said frame below said grapple for severing a standing tree, said severing device comprising an anvil mounted on said frame, an arm pivotally mounted on said frame and having an arcuate portion facing the anvil and including bearing means for supporting a circular saw, a rim driven planar circular saw mounted around a peripheral portion thereof on the arcuate portion of said arm, movement of said arm during pivoting being in a plane transverse to the length of the standing tree, said rim driven saw having cutting formations around the outer periphery thereof projecting in a direction outwardly from the axis of rotation of the saw and having a portion thereof defining teeth for meshing with teeth on a power driven pinion; a motor unit mounted on said arm and having a pinion mounted directly thereon, the teeth of said pinion meshing with the teeth on the circular saw for driving the same, said pinion being a Spur Gear.

2. A felling head as defined in claim 1 wherein the supported peripheral portion of the circular saw projects into a curved channel in said arm and wherein said bearing means engages respectively opposite side faces of the saw.

3. A felling head as defined in claim 2 wherein at least one of the support bearings projects into a groove in a side face of the saw to guide the same.

4. A felling head as defined in claim 1 wherein said circular saw has gear teeth adjacent the outer periphery thereof meshing with the motor driven pinion and wherein cutting teeth of the saw are mounted on the outer end of the gear teeth.

5. A felling head as defined in claim 4 wherein said cutting teeth are detachably mounted on the gear teeth.

6. A felling head as defined in claim 4 wherein each cutting tooth spans across and is connected to at least two adjacent gear teeth.

7. A felling head as defined in claim 4 wherein said pinion has the teeth thereof undercut at the root to promote self-cleaning during use in cutting trees.

8. A felling head as defined in claim 4 wherein said gear teeth of the circular saw comprise pins each having a sleeve roller mounted thereon and including a circumferential ring circumscribing the rollers retaining the same on the pins and wherein the cutting teeth are mounted around the outer periphery of the ring.

9. A felling head as defined in claim 1 wherein said anvil is arcuate.

10. A felling head as defined in claim 1 wherein said anvil comprises a sharpened edge on a plate mounted on the frame.

11. A felling head as defined in claim 9 wherein said anvil has a sharpened edge.

12. Apparatus for transversely cutting elongate articles such as trees or the like and particularly standing trees comprising
   (a) a frame having an anvil thereon;
   (b) an arm pivotally mounted on said frame and having an arcuate portion facing the anvil with bearing means for supporting a circular saw;
   (c) a rim driven circular saw supported along a rim portion thereof on the arcuate portion of the arm, pivotal movement of said arm moving said saw towards said anvil for cutting an article disposed between the saw and the anvil and movable away therefrom to receive another article to be cut, said rim driven saw having cutting formations around the outer periphery thereof projecting in a direction outwardly from the axis of rotation of the saw and having a portion thereof defining teeth for meshing with teeth on a power driven pinion; and
   (d) a motor unit mounted on said arm and having a pinion mounted directly thereon, the teeth of said pinion meshing with the teeth of the circular saw for driving the same, said pinion being a Spur Gear.

13. Apparatus as defined in claim 12 wherein said anvil is concave, such concavity facing the arcuate portion of said arm.

14. Apparatus as defined in claim 12 wherein said anvil has a sharpeded edge facing said circular saw.

15. Apparatus as defined in claim 13 wherein said anvil has a sharpened edge facing said rim driven saw.

16. Apparatus as defined in claim 12 wherein said anvil comprises a flat plate.

17. Apparatus as defined in claim 12 wherein said motor unit is located within the outline configuration of said arm.

18. A felling head comprising in combination:
   (a) a frame having a grapple mounted thereon which is pivotally mounted on the frame for movement toward and away from the other and together providing a grapple jaw which may be selectively opened and closed to respectively receive and grasp a standing tree, power means connected to said movable grapple jaw members selectively to open and close said grapple; and
   (b) a severing device mounted on said frame below said grapple for severing a standing tree, said severing device comprising a rim driven planar circular saw mounted around a peripheral portion thereof on an arm pivotally attached to the frame for movement in a plane transverse to the length of the standing tree, and second power means effecting rotation of said severing device said circular saw having gear teeth adjacent the outer end of the gear teeth, each cutting tooth spanning across and being connected to at least two adjacent gear teeth.

* * * * *